United States Patent
Ström et al.

(10) Patent No.: US 9,280,834 B2
(45) Date of Patent: Mar. 8, 2016

(54) METHOD AND A PROCESSOR FOR TEXTURE COMPRESSION

(75) Inventors: Jacob Ström, Stockholm (SE); Jim Rasmusson, Vellinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 261 days.

(21) Appl. No.: 14/006,009

(22) PCT Filed: Jul. 12, 2011

(86) PCT No.: PCT/EP2011/061870
§ 371 (c)(1),
(2), (4) Date: Sep. 18, 2013

(87) PCT Pub. No.: WO2012/136276
PCT Pub. Date: Oct. 11, 2012

(65) Prior Publication Data
US 2014/0015845 A1     Jan. 16, 2014

Related U.S. Application Data

(60) Provisional application No. 61/471,396, filed on Apr. 4, 2011.

(51) Int. Cl.
G06K 9/36       (2006.01)
G06T 9/00       (2006.01)
(52) U.S. Cl.
CPC ........................................ G06T 9/00 (2013.01)
(58) Field of Classification Search
None
See application file for complete search history.

(56) References Cited

U.S. PATENT DOCUMENTS

| 5,867,593   | A  * | 2/1999  | Fukuda et al. ................. 382/176 |
| 7,266,247   | B2 * | 9/2007  | Kim et al. ...................... 382/236 |
| 2003/0031366 | A1 * | 2/2003  | Li et al. .......................... 382/206 |
| 2004/0201721 | A1 * | 10/2004 | Baharav et al. ............ 348/222.1 |
| 2004/0223662 | A1 * | 11/2004 | Urano et al. .................... 382/299 |
| 2013/0301707 | A1 * | 11/2013 | Lai et al. .................. 375/240.03 |
| 2014/0112593 | A1 * | 4/2014  | Zheng et al. .................. 382/248 |

FOREIGN PATENT DOCUMENTS

WO    WO 2005/059836    6/2005

OTHER PUBLICATIONS

International Search Report, PCT/EP2011/061870, Jan. 11, 2012.
Written Opinion of the International Searching Authority, PCT/EP2011/061870, Jan. 11, 2012.
Written Opinion of the International Preliminary Examining Authority, PCT/EP2011/061870, Mar. 19, 2013.
International Preliminary Report on Patentability, PCT/EP2011/061870, May 8, 2013.

(Continued)

Primary Examiner — Li Liu
(74) Attorney, Agent, or Firm — Myers Bigel Sibley, P.A.

(57) ABSTRACT

Embodiments of the present disclosure relate to a method and arrangement for texture compression. An image block is divided into two half-blocks which are either living, also referred to as flipped configuration, or standing, also referred to as the non-flipped configuration. An estimate is generated for whether the flipped or the non-flipped configuration provides the best result for compressing a block. Compression is only executed for the configuration that is estimated to give the best result for the block.

22 Claims, 8 Drawing Sheets

(56) References Cited

OTHER PUBLICATIONS

J. Strom et al.: "iPACKMAN: High-Quality, Low Complexity Texture Compression for Mobile Phones", Eurographics/Siggraph Graphics Hardware Workshop, XX, XX, Jul. 30, 2005, pp. 63-70, XP002396818.

Yung-Chang Chen et al.: "Advances in Multimedia Information Proceedings-PCM 2002" Dec. 2002, Third IEEE Pacific Rim Conference on Multimedia, Hsinchu, Taiwan, XP002666403, p. 397.

* cited by examiner

METHOD AND A PROCESSOR FOR TEXTURE COMPRESSION

CROSS REFERENCE TO RELATED APPLICATION

This application is a 35 U.S.C. §371 national stage application of PCT International Application No. PCT/EP2011/061870, filed on 12 Jul. 2011, which itself claims the benefit of U.S. provisional Patent Application No. 61/471,396, filed 4 Apr. 2011, the disclosures and contents of both of which are incorporated by reference herein in their entirety.

The above-referenced PCT International Application was published in the English language as International Publication No. WO 2012/136276 A1 on 11 Oct. 2012.

TECHNICAL FIELD

The embodiments of the present invention relate to a method and a processor arrangement for texture compression, and in particular to achieve a faster texture compression.

BACKGROUND

Presentation and rendering of images and graphics on data processing systems and user terminals, such as computers, and in particular on mobile terminals have increased tremendously the last years. For example, graphics and images have a number of appealing applications on such terminals, including games, 3D maps and messaging, screen savers and man-machine interfaces.

However, rendering of textures, and in particular graphics, is a computationally expensive task in terms of memory bandwidth and processing power required for the graphic systems. For example, textures are costly both in terms of memory, the textures must be placed on fast on-chip memory, and in terms of memory bandwidth, a texture can be accessed several times to draw a single pixel.

In order to reduce the bandwidth and processing power requirements, an image (also referred to as texture) encoding method or system is typically employed. Such an encoding system should result in more efficient usage of expensive on-chip memory and lower memory bandwidth during rendering and, thus, in lower power consumption and/or faster rendering. This reduction in bandwidth and processing power requirements is particularly important for thin clients, such as mobile units and telephones, with a small amount of memory, little memory bandwidth and limited power (powered by batteries).

One texture encoding method is referred to as ETC1 (Ericsson Texture Compression, version 1) which is further described in "iPACKMAN: High-Quality, Low-Complexity Texture Compression for Mobile Phones" by Jacob Strom and Tomas Akenine-Moller, Graphics Hardware (2005), ACM Press, pp. 63-70.

Today, ETC1 is available on many devices. For instance, Android supports ETC1 from version 2.2 (Froyo), meaning that millions of devices are running ETC1.

ETC1 was originally developed to be an asymmetric codec; decompression had to be fast, but compression was supposed to be done off-line and could take longer. However, recent developments have made it important to be able to compress an image to ETC1-format very quickly.

Another texture compression format is DXT1 (DirectX Texture compression, codec 1). However, platforms built for OpenGL ES may support ETC1 but not DXT1. It is therefore desired to be able to transcode DXT1 textures to ETC1. This way, after transcoding, rendering can be done from ETC1 instead, for which there is hardware support. However, the transcoding has to be fast enough for the user not to notice. It has been estimated that transcoding 20 Megapixels in less than 30 seconds is the upper limit. Ideally, it should be faster than that, perhaps 5 seconds.

To that end, it is desired to be able to transcode DXT1 textures to ETC1 textures quickly.

It should be noted that the ETC1 encoding is beneficial under many circumstances, not only when transcoding from DXT1 data.

A problem is that current methods for transcode DXT1 textures to ETC1 are not fast enough. Also, image quality has been sacrificed in order to obtain faster encoding.

As an example, the software package "etcpack" that Ericsson provides to Khronos users has three modes; "fast", "medium" and "slow". Even the "fast" mode takes around 640 seconds to encode 20 Megapixel of RGB8 data on a mobile device (exemplified by a Sony Ericsson Xperia X10 mini). This is more than 20 times the stipulated 30 seconds. A more stripped-down version of the same code called "average", takes about 264 seconds, but this is still eight times slower than necessary.

One of the things that take time is that the ETC1 codec has two modes, "flipped" and "non-flipped". To understand how this works the ETC1 codec will be described a bit more:

ETC1 compresses a 4×4 blocks by treating them as two half-blocks. Each half-block gets a "base color", and then the luminance (intensity) can be modified in the half-block. This is illustrated in FIG. 1.

The left image in FIG. 1 is divided into blocks that are further divided into half-blocks that are either lying or standing. Only one base color per half-block is used. In the middle image of FIG. 1, per pixel luminance is added. The resulting image is shown in the right image of FIG. 1.

The half-blocks can either be of 2×4 pixels referred to as "standing", or "non-flipped" half-blocks, or they can be two 4×2 blocks referred to as "lying", or "flipped" half-blocks.

Typically an encoder would try both of these configurations and select the one, flipped or non-flipped, that resulted in the smallest error between the decoded 4×4 block and the original. However, due to time restrictions, there is no time to try both configurations. Instead, it has been determined to always use the "flipped" configuration. This method is called "fixed flip", since the flip bit is fixed to 1. Compared to the "average" configuration, this cuts the compression time roughly in half, meaning that the time is reduced from 264 seconds to 132 seconds. This is still more than 4 times the desired 30 seconds. Unfortunately, for many blocks, the flipped configuration is not the optimal choice. This will mean that image artifacts appear in the image, artifacts that are clearly visible to the end user. The artifacts are very disturbing in areas where a standing, non-flipped block would have been much better than a flipped one. An example can be seen in FIG. 2.

A full original/DXT1 image is shown in FIG. 2(a). A zoomin of the DXT1 image is shown in FIG. 2(b). The result of "average" compression is shown in FIG. 2(c) and the result of "fixed flip" compression is shown in FIG. 2(d). The artifacts are much bigger in (d) than in (c).

SUMMARY

Thus the object of the embodiments of the present invention is to achieve a faster texture compression.

That is achieved by estimating whether the flipped or the non-flipped configuration provides the best result for compressing a block and by only executing the compression for the configuration that is estimated to give the best result for said block. Accordingly, each block is divided into half-blocks which are either lying, referred to as flipped configuration or standing referred to as the non-flipped configuration.

According to a first aspect of embodiments of the present invention a method in a processor for compressing an image block to be divided into two half-blocks is provided.

In the method, it is estimated whether said half-blocks are to be configured in a flipped or in a non-flipped configuration. The estimation is performed by determining color representation values for a left part of the block, a right part of the block, a top part of the block and a bottom part of the block, wherein the color representation values comprise value measures for at least one of the red, green and blue color components. The estimation is further performed by determining a first difference between the color representation values of the left part of the block and the color representation values of the right part of the block and second difference between the color representation values of the top part of the block and the color representation values of the bottom part of the block. The first and second differences are compared and if it is determined that the first difference is bigger than the second difference, the block is compressed by using the non-flipped configuration. If it is determined that the first difference is smaller than the second difference, the block is compressed by using the flipped configuration.

According to a second aspect of the embodiments of the present invention a processor for compressing an image block to be divided into two half-blocks is provided. The processor is configured to estimate whether said half-blocks are to be configured in a flipped or in a non-flipped configuration. The estimation is performed by determining color representation values for a left part of the block, a right part of the block, a top part of the block and a bottom part of the block, wherein the color representation values comprise value measures for at least one of the red, green and blue color components, determining a first difference between the color representation values of the left part of the block and the color representation values of the right part of the block and second difference between the color representation values of the top part of the block and the color representation values of the bottom part of the block, and comparing the first and second differences. The processor is further configured to compress the block by using the non-flipped configuration if it is determined that the first difference is bigger than the second difference, and to compress the block by using the flipped configuration if it is determined that the first difference is smaller than the second difference.

An advantage with the embodiments of the present invention is that compared to testing both configurations, flipped/non-flipped, they also cuts the compression time in half, but if the estimation is correct, the quality will dramatically increase for the blocks where the "non-flipped" is a much better choice than "flipped". The quality is much better than for "fixed flipped", and almost as good as "average".

This has been determined by using an original DXT1 image, wherein the result of "average" compression gives PSNR=31.02 dB. The result of "fixed flip" compression gives PSNR=30.27 dB and the result of an embodiment according to an embodiment of the present invention gives PSNR=30.87 dB.

Measured in Peak Signal-to-Noise Ratio (PSNR), the improvement is 0.6 dB, which is quite substantial. Moreover, since around half of the blocks see no improvement at all (since the flipped configuration is the best for them), the improvements in the block that see change is roughly twice as big, or 1.2 dB.

DETAILED DESCRIPTION

Figure 1:
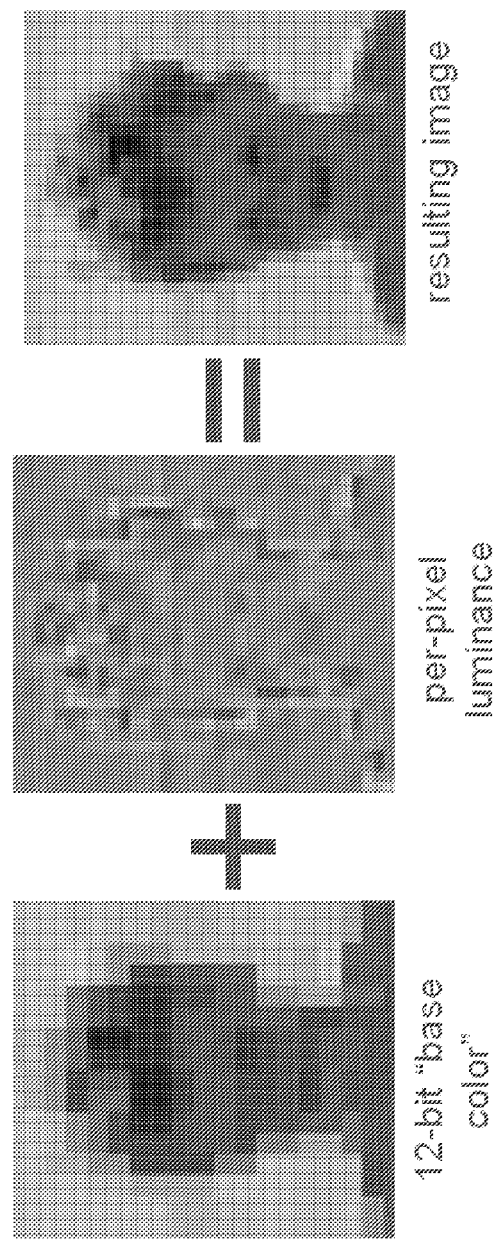
FIG. 1 illustrates texture encoding by ETC1 according to prior art. In the left figure, the image is divided into blocks that are further divided into half-blocks that are either lying or standing. Only one base color per half-block is used. In the figure in the middle, per pixel luminance is added and the right figure shows the resulting image.
Figure 2:
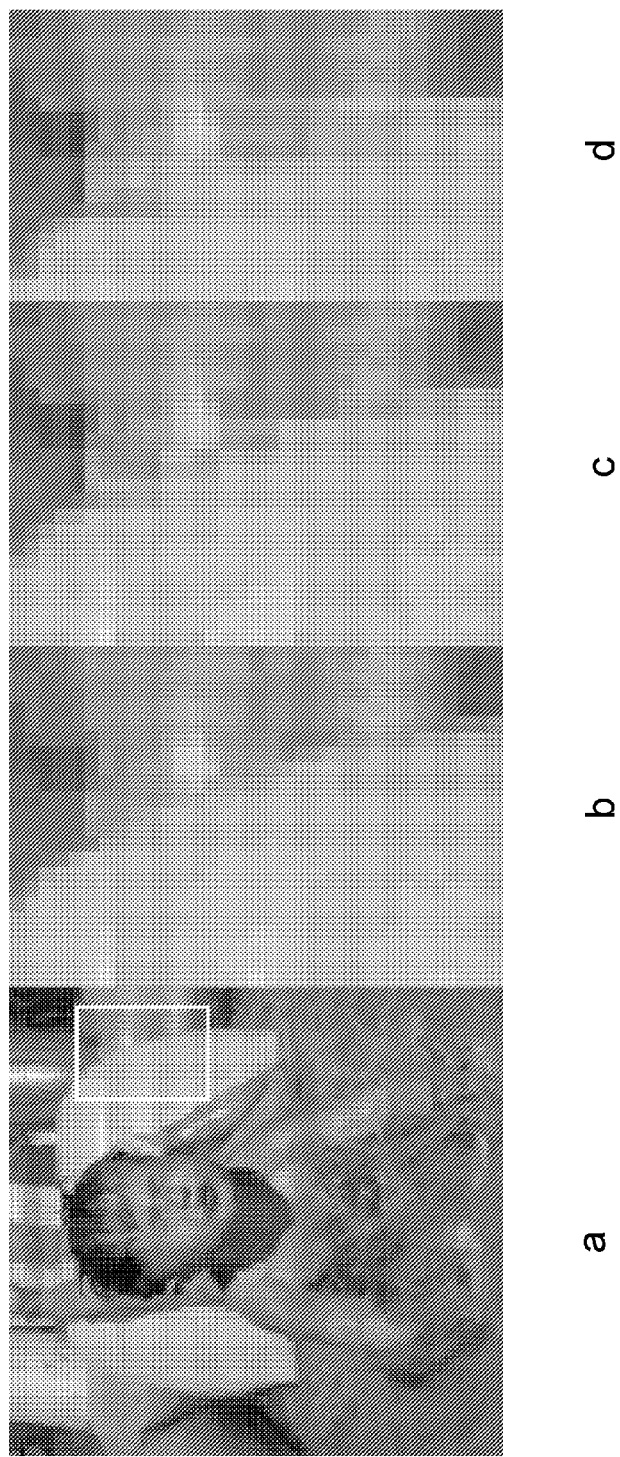
FIG. 2 illustrates that the result of the "average" compression is better than the result of the "fixed flip" compression according to prior art.
Figure 3:
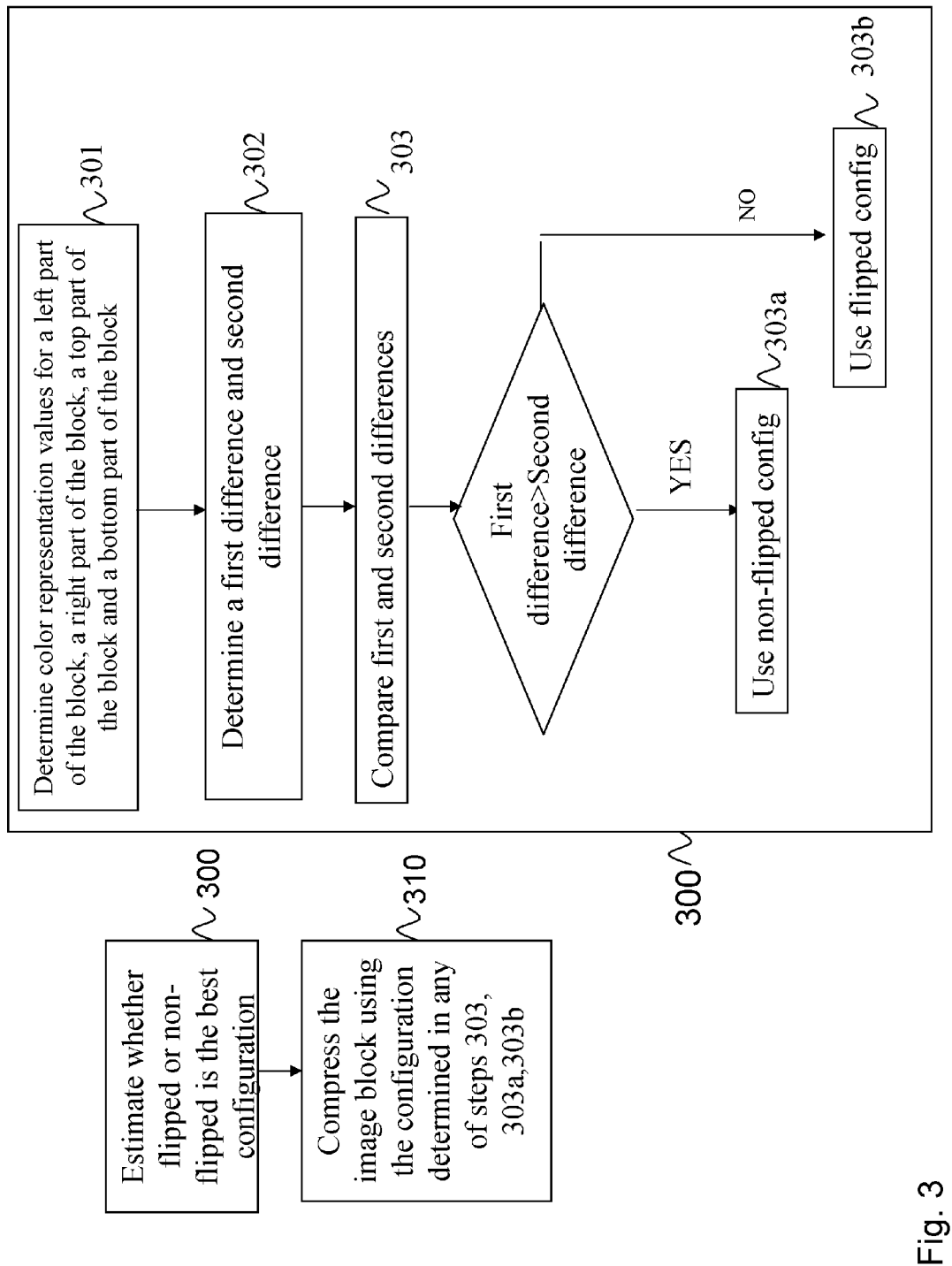
FIG. 3 is a flowchart of a method according to one embodiment.

Accordingly as illustrated in the flowchart of FIG. 3, the image to be compressed is divided into blocks and each block is divided A into half-blocks which are either lying, referred to as flipped configuration, or standing, referred to as the non-flipped configuration.

It is estimated B whether the flipped or the non-flipped configuration provides the best result for compressing a block and by only executing the compression for the configuration that is estimated to give the best result for said block.

As illustrated in FIG. 3, the estimation is achieved by determining 301 color representation values for a left part of the block, a right part of the block, a top part of the block and a bottom part of the block. The color representation values comprise measures for at least one of the red, green and blue color components. A first difference between the color representation values of the left part of the block and the color representation values of the right part of the block and second difference between the color representation values of the top part of the block and the color representation values of the bottom part of the block are determined 302. The first and second differences are compared 303 and if it is determined that the first difference is bigger than the second difference, the block should be compressed 310,303a by using the non-flipped (i.e. the standing) configuration and if it is determined that the first difference is smaller than the second difference, the block should be compressed 310,303b by using the flipped (i.e. the lying) configuration.

It should be noted that when determining the differences between two color representation values a and b, the absolute value of the difference (abs(a−b)) has to be used or the difference has to be squared ((a−b)*(a−b)) in order to obtain a correct result. Other distance metrics such as $(a-b)^4$ are also possible.

According to embodiments, the color representation values are color averages for the relevant area, i.e. the top, bottom, right and left part, respectively. It should be noted that although the embodiments described below are exemplified by average measures, other measures such as variance, individual pixel values, or sums as described below can also be used.

Figure 4:
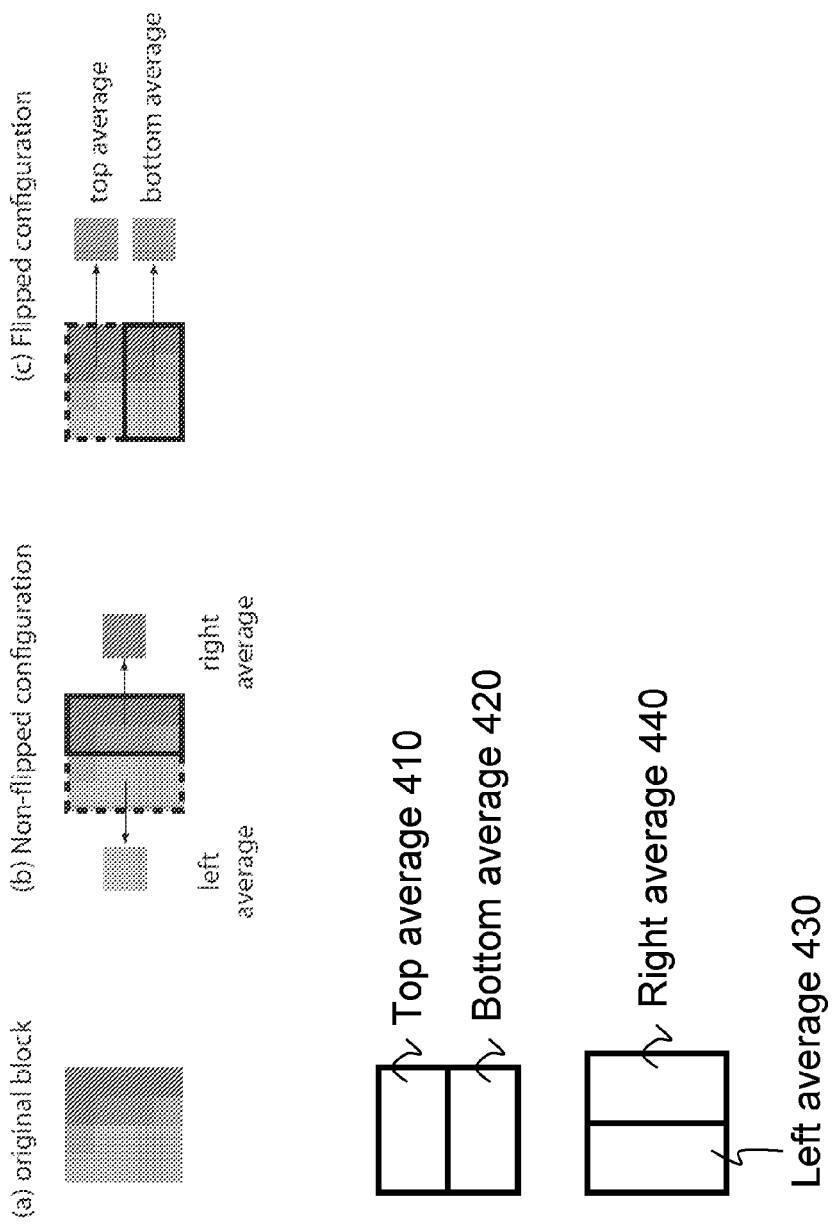
FIG. 4 shows an arrangement according to embodiments of the present invention.

Hence, the estimation whether the flipped or the non-flipped configuration provides the best result for compressing a block is based on the fact that if the structure of the block is well aligned with the flip orientation (i.e. flipped or non-flipped), there will be a big difference between the average color of the compared blocks. On the other hand, if the pixels of the block are oriented orthogonal to the flipping direction, the two average colors will be quite similar. This is illustrated in FIG. 4. It is illustrated how the block is divided into areas for determining the color representation values for the top part 410, bottom part 420, left part 430 and the right part 440. In the example in FIG. 4, the difference in color representation values are larger in the horizontal direction than the vertical direction. According to the flowchart of FIG. 3, this implies that a non-flipped configuration is a better configuration than the flipped configuration.

As mentioned above, the method according to embodiments comprises therefore the step of calculating the following color averages referred to as left[3], right[3], top[3] and bot[3]:

left[3] indicates the color average of the left half-block
right[3] indicates the color average of the right half-block
top[3], indicates the color average of the top half-block
bot[3], indicates the color average of the bottom half-block All these color averages are 3-vectors since they hold the average for the red, the green and the blue component.

Next, the difference between the left and right color averages is calculated as $$\text{diff\_left\_right} = (\text{left}[0] - \text{right}[0])^2 + (\text{left}[1] - \text{right}[1])^2 + (\text{left}[2] - \text{right}[2])^2$$

The difference between top and bottom color averages is also calculated:

$$\text{diff\_top\_bot} = (\text{top}[0] - \text{bot}[0])^2 + (\text{top}[1] - \text{bot}[1])^2 + (\text{top}[2] - \text{bot}[2])^2$$

[0], [1], [2] correspond respectively to one of red green and blue. As should be clear from FIG. 3, in a block which is oriented left-to-right, the difference between the left and right averages should be bigger than the difference between the top and bottom averages. Hence, according to the embodiments the rule is:

```
if( diff_left_right > diff_top_bot )    pseudocode 1
    compress block as non-flipped
else
    compress block as flipped
```

It is typically much faster to calculate the averages and execute pseudo code 1 above, than to complete a compression of the block in both flipped and non-flipped mode and see which is better. Although, the execution time on an Xperia X10 mini goes up from 132 seconds with "fixed flip" to 137 seconds with the pseudocode 1 of the embodiments, the quality on the other hand increases dramatically. The time-to-quality ratio is still very good.

Typically when calculating an average value, a sum of the individual values is formed and is then divided by the number of values. However, when comparing two such averages, if the number of values is the same, it is not needed to divide by the number of values, since the division will affect both values equally. Therefore, according to an embodiment, left[0], right[0], top[0], bot[0], left[1], ... and so forth can be calculated as the sum of the corresponding values as opposed to the average of the same values. This removes the need for division. The resulting if-statement diff_left_right>diff_top_bot will generate the same decision as if true averaging were used, even though diff_left_right and diff_top_bot will be 64 times bigger.

Figure 5:
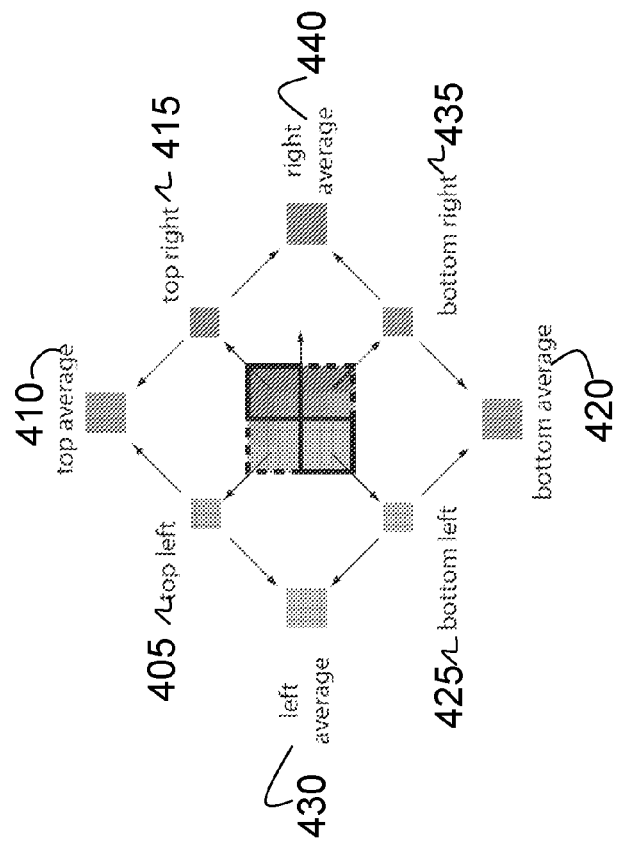
FIGS. 5-7 illustrates different ways of using helper variables to make the embodiments less computationally expensive.

According to an embodiment, one way to further reduce the time for calculating the color averages further is to take advantage of the fact that the regions overlap. For instance, the top-average overlaps with the left-average in the top left corner. Therefore it is possible to lower the computation further by calculating helper variables called topleft 405, topright 415, bottomleft 425 and bottomright 435 for each color component, as shown in FIG. 5. The helper variables indicate the color average for the respective topleft 405, topright 415, bottomleft 425 and bottomright 435 areas of the block. Thus the topleft 405 helper variable is used when calculating both the color average for the top part and the left part of the block, the topright 415 helper variable is used when calculating both the color average for the top part and the right part of the block, the bottomleft 425 helper variable is used when calculating both the color average for the bottom part and the left part of the block, and the bottomright 435 helper variable is used when calculating both the color average for the bottom part and the right part of the block.

Since calculation of "top left" 405 only involves four pixels, it can be done using three additions per color channel. Thus all helper variables can be calculated using 12 additions per channel. To calculate each variable, only one addition per channel is needed. For instance, the red channel of the left average is calculated using top_left[0]+bottom_left[0]. This equates to 16 additions per channel, or 48 additions in total.

As a comparison, brute-force calculation of each average involves 7 additions per channel, i.e., 24 per channel for all averages or 84 additions in total.

Figure 6:
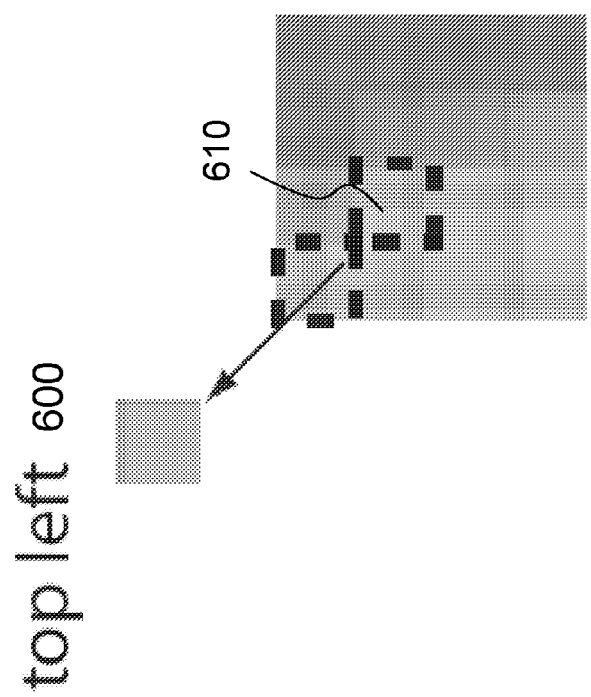

This way of using the averages to guess the best flip orientation does of course not work 100% of the time. Going from "fixed flip" to the embodiments of the present invention increases the PSNR from 30.28 dB to 30.87 dB, but actually trying both flip modes to see which is better gives a PSNR score of 31.02 dB. This begs the question whether it is possible to make an even simpler test that performs almost as well as the above described embodiments. One possibility is to calculate the helper variables "topleft", "topright", "bottomleft" and "bottomright" in a simpler way. According to a further embodiment, e.g. the color averages for the color components of the "topleft" 405 helper variable is calculated by determining the color averages (or the color sums) of the color components of the topleft pixel 600 plus a diagonally opposed pixel 610, as shown in FIG. 6. The other helper variables can be determined in a corresponding manner.

According to a further embodiment, the topleft 405 helper variable is determined by just using the color representation values of the color components of the top left pixel as it is. The other helper variables can be determined in the same way.

Figure 7:
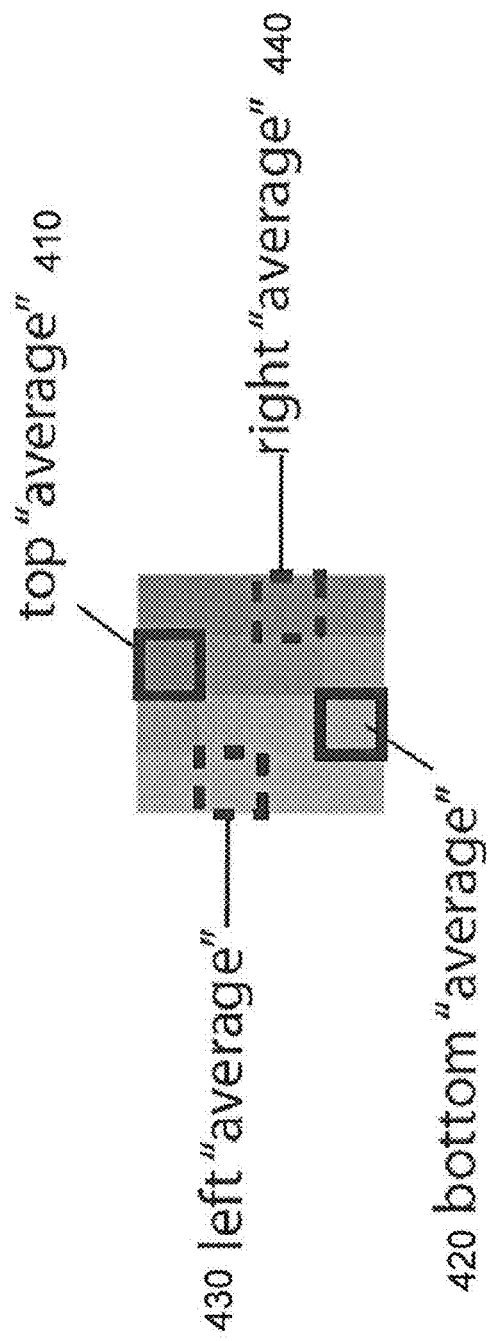

According to a yet further embodiment, another solution for determining the average values is to just select a pixel in the left region to be used for determining "left_average" for the different color components, another pixel in the top region to be used for top "average" for the different color components etc. as shown in FIG. 7.

According to a yet further alternate embodiment, the metric used for the difference can be changed. Instead of e.g. using $$\text{diff\_left\_right} = (\text{left}[0] - \text{right}[0])^2 + (\text{left}[1] - \text{right}[1])^2 + (\text{left}[2] - \text{right}[2])^2$$

which uses an Euclidean metric, it is possible to use absolute values instead:

$$\text{diff\_left\_right} = |\text{left}[0] - \text{right}[0]| + |\text{left}[1] - \text{right}[1]| + |\text{left}[2] - \text{right}[2]|$$

where $|x| = \text{abs}(x)$ is the absolute value of x, which is sometimes cheaper to calculate than $x^2$.

Another alternative is to replace the summation over the color components with a maximum value:

$$\text{diff\_left\_right} = \max\{|\text{left}[0] - \text{right}[0]|, |\text{left}[1] - \text{right}[1]|, |\text{left}[2] - \text{right}[2]|\},$$

where $\max\{a, b, c\}$ equals the maximum value of the three values a, b and c.

Yet another alternative is to ignore one or two of the color channels when calculating the differences. For instance, one could use only the green component:
$\text{diff\_left\_right} = |\text{left}[1] - \text{right}[1]|$. In an alternate embodiment, the average color representation values are quantized before they are compared. As previously, the following averages are calculated
left[3] which is the average of the left half-block
right[3] which is the average of the right half-block
top[3], the average of the top half-block
bot[3], the average of the bottom half-block
using any of the previous calculations or approximations. Before comparing however, the values are first quantized:
quant_left[3]=quantize(left[3])
quant_right[3]=quantize(right[3])
quant_top[3]=quantize(top[3])
quant_bot[3]=quantize(bot[3])
and the differences are instead calculated from the quantized values:

$$\text{quant\_diff\_left\_right} = (\text{quant\_left}[0] - \text{quant\_right}[0])^2 + (\text{quant\_left}[1] - \text{quant\_right}[1])^2 + (\text{quant\_left}[2] - \text{quant\_right}[2])^2$$

or using some other difference metric. The difference between top and bottom is also calculated:

$$\text{quant\_diff\_top\_bot} = (\text{quant\_top}[0] - \text{quant\_bot}[0])^2 + (\text{quant\_top}[1] - \text{quant\_bot}[1])^2 + (\text{quant\_top}[2] - \text{quant\_bot}[2])^2$$

And the final decision is taken using

```
if( quant_diff_left_right > quant_diff_top_bot)    pseudocode 2
    compress block as non-flipped
else
    compress block as flipped.
```

The quantize( )-function can be a simple quantization from 8 bits to 5 bits (or 4 bits) through right-shifting three steps (or four steps). However, it can also be more elaborate; if the quantization is done while keeping in mind that the luminance error can be corrected, other quantization values may be chosen. This is described in WO2005/059836 as "combined quantization". Thus, in one embodiment of our invention, the quantize( ) function will implement the "combined quantization" from WO2005/059836.

In yet an alternate embodiment the variances are calculated instead of the averages in the half-blocks as mentioned above. In this embodiment:

```
if( diff_variance_left_right > diff_variance_top_bot)
    compress block as non-flipped
else
    compress block as flipped.
```

The above described method can be implemented in an arrangement comprising one or more CPUs or one or more GPUs, or a combination thereof. Each CPU can also have one or several cores, and each GPU can also have one or several cores. This implies that the arrangement is configured to estimate whether the flipped or the non-flipped configuration provides the best result for compressing a block, and to only execute the compression for the configuration that was estimated to provide the best result for said block.

Accordingly a processor 820;830 for compressing an image block to be divided into two halfblocks is provided according to embodiments. The processor is configured to divide each block of the image into two half-blocks, and to estimate whether said half-blocks are to be configured in a flipped or in a non-flipped configuration. The estimation is performed by determining color representation values for a left part of the block, a right part of the block, a top part of the block and a bottom part of the block, wherein the color representation values comprise value measures for red, green and blue color components. A first difference between the color representation values of the left part of the block and the color representation values of the right part of the block is determined and second difference between the color representation values of the top part of the block and the color representation values of the bottom part of the block is determined. The first and second differences are compared by the processor and the processor 820;830 is further configured to compress the block by using the non-flipped configuration if it is determined that the first difference is bigger than the second difference, and to compress the block by using the flipped configuration if it is determined that the first difference is smaller than the second difference.

Figure 8:
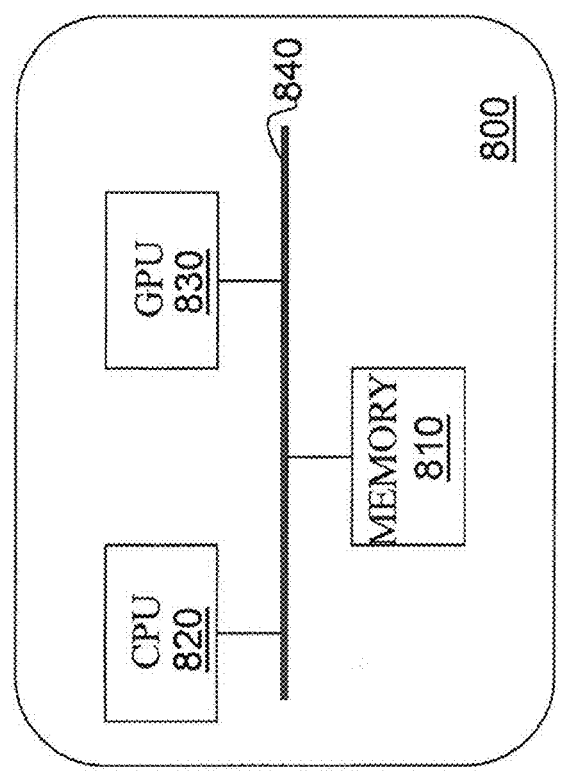
FIG. 8 illustrates an arrangement in which the embodiments can be implemented.

The processor may be the CPU 820 and or the GPU 830 illustrated in FIG. 8.

Thus, FIG. 8 exemplifies an arrangement 800 configured to implement the embodiments. The arrangement 800 comprises a bus 840 connecting a CPU 820, GPU 830 and a memory 810. The CPU 820 and the GPU 830 may be situated on the same chip or on different chips. The arrangement according to embodiments of the present invention comprising one or more CPUs and/or GPUs may be associated with a memory 810 storing the textures to be compressed. If the method is carried out by means of software, the software code portions adapted to carry out the method may also be stored in the memory. These software code portions are processed by the CPU 820 or the GPU 830 or by the CPU 820 and the GPU 830 simultaneously. It should be noted that the embodiments can be implemented by hardware or software or a combination thereof.

The invention claimed is:

1. A method in a processor for compressing an image block to be divided into two half-blocks, the method comprises:
    estimating whether said half-blocks are to be configured in a lying or in a standing configuration, wherein the estimation is performed by:
        determining color representation values for a left part of the block, a right part of the block, a top part of the block and a bottom part of the block, wherein the color representation values comprise value measures for at least one of red, green and blue color components,
        determining a first difference between the color representation values of the left part of the block and the color representation values of the right part of the block and second difference between the color representation values of the top part of the block and the color representation values of the bottom part of the block, comparing the first and second differences and performing:
if the comparison determines that the first difference is bigger than the second difference, compressing the block by using the standing configuration, and
if the comparison determines that the first difference is smaller than the second difference, compressing the block by using the lying configuration,
determining a topleft helper variable based on color representation values of a topleft part of the block, determining a topright helper variable based on color representation values of a topright part of the block, determining a bottomleft helper variable based on color representation values of a bottomleft part of the block, and determining a bottomright helper variable based on color representation values of a bottomright part of the block,
wherein the color representation values for the left part of the block are determined based on the topleft and bottomleft helper variables, the color representation values for the right part of the block are determined based on the topright and bottomright helper variables, the color representation values for the top part of the block are determined based on the topright and topleft helper variables, and the color representation values for the bottom part of the block are determined based on the bottomright and bottomleft helper variables.

2. The method according to claim 1, wherein the topleft helper variable is determined based on a pixel in the topleft part of the block, the topright helper variable is determined based on a pixel in the topright part of the block, the bottomleft helper variable is determined based on a pixel in the bottomleft part of the block, and the bottomright helper variable is determined based on a pixel in the bottomright part of the block.

3. The method according to claim 1, wherein the topleft helper variable is determined based on a pixel in the topleft part of the block and another pixel diagonally opposed to the pixel in the topleft part, the topright helper variable is determined based on a pixel in the topright part of the block and another pixel diagonally opposed to the pixel in the topright part, the bottomleft helper variable is determined based on a pixel in the bottomleft part of the block and another pixel diagonally opposed to the pixel in the bottomleft part, and the bottomright helper variable is determined based on a pixel in the bottomright part of the block and another pixel diagonally opposed to the pixel in the bottomright part.

4. The method according to claim 1, wherein the color representation values are averages.

5. The method according to claim 1, wherein the color representation values are variances.

6. The method according to claim 1, wherein the color representation values are individual pixel values.

7. The method according to claim 1, wherein the color representation values are sums of individual pixel values.

8. The method according to claim 1, wherein metrics used for determining the first and second differences are Euclidian metrics.

9. The method according to claim 1, wherein metrics used for determining the first and second differences are absolute values.

10. The method according to claim 1, wherein metrics used for determining the first and second differences are maximum values of the color components.

11. The method according to claim 1, wherein the color representation values are quantized before the first and second differences are determined.

12. An arrangement for compressing an image block to be divided into two half-blocks, the arrangement comprising:
a memory storing software code; and
a processor that executes the software code from the memory to:
estimate whether said half-blocks are to be configured in a lying or in a standing configuration, wherein the estimation is performed by:
determining color representation values for a left part of the block, a right part of the block, a top part of the block and a bottom part of the block, wherein the color representation values comprise value measures for at least one of red, green and blue color components,
determining a first difference between the color representation values of the left part of the block and the color representation values of the right part of the block and second difference between the color representation values of the top part of the block and the color representation values of the bottom part of the block, and
comparing the first and second differences and performing:
compressing the block by using the standing configuration if the comparison determines that the first difference is bigger than the second difference, and
compressing the block by using the lying configuration if the comparison determines that the first difference is smaller than the second difference,
determining a topleft helper variable based on color representation values of a topleft part of the block, determining a topright helper variable based on color representation values of a topright part of the block, determining a bottomleft helper variable based on color representation values of a bottomleft part of the block, and determining a bottomright helper variable based on color representation values of a bottomright part of the block,
wherein the color representation values for the left part of the block are determined based on the topleft and bottomleft helper variables, the color representation values for the right part of the block are determined based on the topright and bottomright helper variables, the color representation values for the top part of the block are determined based on the topright and topleft helper variables, and the color representation values for the bottom part of the block are determined based on the bottomright and bottomleft helper variables.

13. The arrangement according to claim 12, wherein the topleft helper variable is determined based on a pixel in the topleft part of the block, the topright helper variable is determined based on a pixel in the topright part of the block, the bottomleft helper variable is determined based on a pixel in the bottomleft part of the block, and the bottomright helper variable is determined based on a pixel in the bottomright part of the block.

14. The arrangement according to claim 12, wherein the topleft helper variable is determined based on a pixel in the topleft part of the block and another pixel diagonally opposed to the pixel in the topleft part, the topright helper variable is determined based on a pixel in the topright Part of the block and another pixel diagonally opposed to the pixel in the topright part, the bottomleft helper variable is determined based on a pixel in the bottomleft part of the block and another pixel diagonally opposed to the pixel in the bottomleft part and the bottomright helper variable is determined based on a pixel in the bottomright part of the block and another pixel diagonally opposed to the pixel in the bottomright part.

15. The arrangement according to claim 12, wherein the color representation values are averages.

16. The arrangement according to claim 12, wherein the color representation values are variances.

17. The arrangement according to claim 12, wherein the color representation values are individual pixel values.

18. The arrangement according to claim 12, wherein the color representation values are sums of individual pixel values.

19. The arrangement according to claim 12, wherein metrics used for determining the first and second differences are Euclidian metrics.

20. The arrangement according to claim 12, wherein metrics used for determining the first and second differences are absolute values.

21. The arrangement according to claim 12, wherein metrics used for determining the first and second differences are maximum values of the color components.

22. The arrangement according to claim 12, wherein the color representation values are quantized before the first and second differences are determined.

* * * * *